United States Patent [19]

Leone

[11] Patent Number: 5,551,575
[45] Date of Patent: Sep. 3, 1996

[54] SHALE SHAKER SCREENS

[75] Inventor: Vincent D. Leone, Houston, Tex.

[73] Assignee: Environmental Procedures, Inc., Houston, Tex.

[21] Appl. No.: 282,983

[22] Filed: Jul. 29, 1994

[51] Int. Cl.⁶ ................................................. B07B 1/04
[52] U.S. Cl. ...................... 209/273; 209/311; 209/313; 209/325; 209/353; 209/403
[58] Field of Search ............................ 209/268, 269, 209/273, 311, 313, 314, 325, 341, 353, 354, 403, 392, 405, 408; 210/388, 407, 488, 489, 499

[56] References Cited

U.S. PATENT DOCUMENTS

| | | |
|---|---|---|
| D. 37,045 | 7/1904 | MacMurray . |
| 275,190 | 4/1883 | Gilbert et al, . |
| 865,185 | 11/1906 | Kerrigan . |
| 984,866 | 2/1911 | Tate . |
| 1,098,979 | 6/1914 | Schuchard . |
| 1,344,747 | 6/1920 | Wright . |
| 1,397,339 | 11/1921 | Sturtevant . |
| 1,462,804 | 7/1923 | Evans . |
| 1,505,735 | 8/1924 | Stebbins . |
| 1,561,632 | 11/1925 | Woodward . |
| 1,678,941 | 7/1928 | Helman . |
| 1,716,758 | 6/1929 | Bland . |
| 1,747,631 | 2/1930 | Helman . |
| 1,822,298 | 9/1931 | Kerrigan . |
| 1,879,377 | 9/1932 | McNeely ................................ 209/403 |
| 1,950,861 | 3/1934 | O'Toole, Sr. . |
| 1,997,713 | 4/1935 | Boehm .................................. 209/393 |
| 2,061,850 | 11/1936 | Roberts .................................. 210/76 |
| 2,235,653 | 3/1941 | Soldan ................................... 209/401 |
| 2,827,169 | 3/1958 | Lusi ....................................... 209/397 |
| 2,902,165 | 9/1959 | Imershein .............................. 210/486 |
| 2,910,183 | 10/1959 | Hayes .................................... 210/315 |
| 2,929,464 | 3/1960 | Sprouse ................................. 183/69 |

(List continued on next page.)

FOREIGN PATENT DOCUMENTS

| | | |
|---|---|---|
| 0169698 | 1/1986 | European Pat. Off. . |
| 2380080A | 9/1978 | France . |
| 2513101A | 10/1976 | Germany . |
| 2090152A | 7/1982 | United Kingdom . |
| 2161715B | 1/1986 | United Kingdom . |
| 2162091B | 1/1986 | United Kingdom . |
| 2206501A | 1/1989 | United Kingdom . |

OTHER PUBLICATIONS

"Sweco Full Flow," Sweco, Inc. Mar. 1992.
"Supertaut Mud Cleaner Screens," Sweco Oilfield Services, prior to 1993.
"Swaco Geolograph," M. I. Drilling Fluids, Dec. 1993 particularly pp. 6,7,18,19.
"Advanced Wirecloth, Inc.," Advanced Wirecloth, Inc. prior to Aug. 1993.
"LM3 Full–Flo shale Shaker," Sweco Oilfield Services, 1991.
"Screening Equipment Handbook," Pankratz, pp. 14, 18 186, 188; 1988.
"The Right Screen Makes The Difference" CPI Group Inc., 1990.
"The Future of Fine Screening," Derrick Equipment Co., Apr. 1993.
"Derrick Pyramid Screens," Derrick Equipment Co., July 1994.

Primary Examiner—David H. Bollinger
Attorney, Agent, or Firm—Guy McClung

[57] ABSTRACT

Screens have been developed which, in one aspect, have interconnection apparatus including male projections on one first screen end which are received in female openings on another adjacent screen end. In one aspect the female openings are defined by raised portions of a three-dimensional screen and the male projections either are formed of the other screen's end or are part of plugs inserted into raised portions of the first screen end. A shale shaker has been developed with such screens. In one aspect such a shale shaker has screens disposed in a tiered configuration, one screen in sealing contact with the next. Screen connector apparatus has also been developed for such screens.

24 Claims, 6 Drawing Sheets

U.S. PATENT DOCUMENTS

| | | | |
|---|---|---|---|
| 3,057,481 | 10/1962 | Pall | 210/493 |
| 3,165,473 | 1/1965 | Pall et al. | 210/510 |
| 3,255,885 | 6/1966 | Burls | 209/314 |
| 3,451,555 | 6/1969 | Ginaven | 210/433 |
| 3,666,095 | 5/1972 | Krynock et al. | 209/314 X |
| 3,679,057 | 7/1972 | Perez | 210/223 |
| 3,747,772 | 7/1973 | Brown | 210/493 |
| 3,960,731 | 6/1976 | Brandt | 210/332 |
| 4,019,987 | 4/1977 | Krasnow | 210/232 |
| 4,022,596 | 5/1977 | Pedersen | 55/528 |
| 4,033,865 | 7/1977 | Derrick, Jr. | 209/275 |
| 4,040,951 | 7/1977 | Cole | 209/408 |
| 4,190,527 | 2/1980 | Spiller | 209/392 X |
| 4,380,494 | 4/1983 | Wilson | 209/319 |
| 4,457,839 | 7/1984 | Bailey | 209/234 |
| 4,575,421 | 3/1986 | Derrick et al. | 209/397 |
| 4,728,422 | 3/1988 | Bailey | 210/314 |
| 4,820,407 | 4/1989 | Lilie | 209/397 |
| 4,882,054 | 11/1989 | Derrick et al. | 210/389 |
| 5,084,178 | 1/1992 | Miller et al. | 210/493.5 |
| 5,137,622 | 8/1992 | Souter | 209/403 |
| 5,211,291 | 5/1993 | Kelley et al. | 209/680 |
| 5,221,008 | 6/1993 | Derrick, Jr. et al. | 209/269 |
| 5,330,057 | 7/1994 | Schiller et al. | 209/392 |
| 5,363,970 | 11/1994 | Freissle | 209/408 X |
| 5,417,858 | 5/1995 | Derrick et al. | 210/388 |
| 5,417,859 | 5/1995 | Bakula | 210/388 |

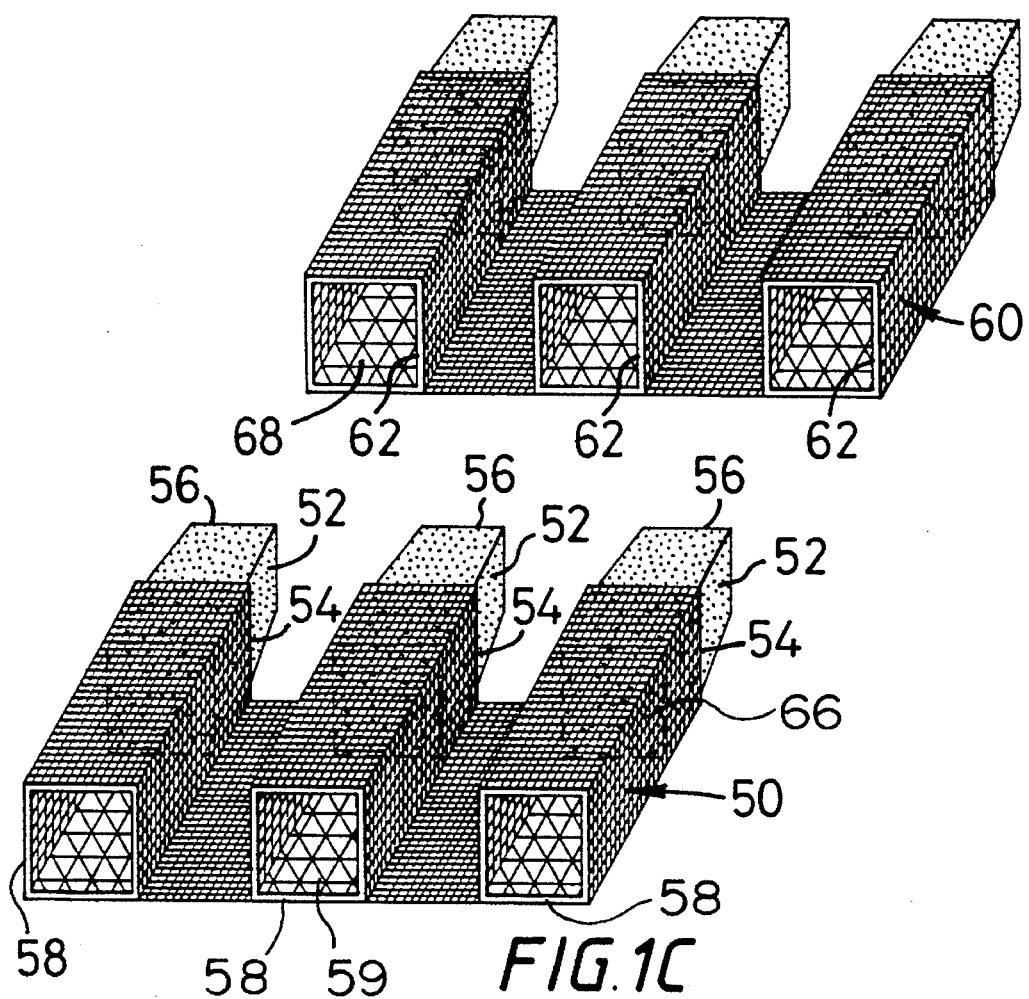
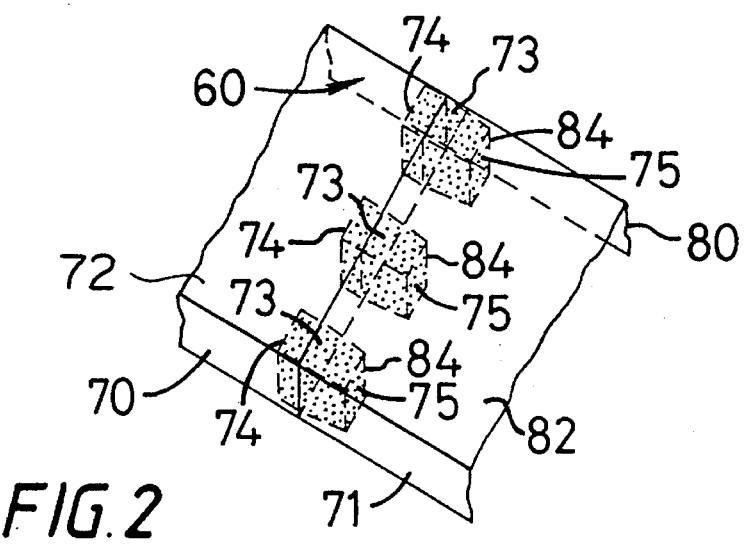

SHALE SHAKER SCREENS

BACKGROUND OF THE INVENTION

1. Field of the Invention

The present invention is directed to screens; to filtering screens; to devices with vibrating screens; to shale shakers with vibrating screens; to shale shakers with screens in series and with tiered screens; and to methods and devices for sealing screen interfaces and for aligning adjacent screens.

2. Description of Related Art

The prior art discloses a wide variety of vibrating screens, devices which use screens, shale shakers, and screens for shale shakers. In shale shakers which use a plurality of screens, problems are encountered with the leakage of drilling fluid, e.g. mud, between screens.

Drilling fluid, e.g. mud, typically a mixture of clay and water and various additives, is pumped through a hollow drill string (pipe, drill collar, bit, etc.) down into a well and exits through holes in a drillbit. The mud picks up cuttings (rock chips) and other solids from the well and carries them upwardly away from the bit and out of the well in a space between the well walls and the drill string. At the top of the well, the solids-laden mud is introduced to a shale shaker, a device which typically has a series of screens disposed end-to-end and arranged in tiered or flat disposition with respect to each other. The screens catch and remove solids from the mud as the mud passes through them. If drilled solids are not removed from the mud used during the drilling operation, recirculation of the drilled solids can create viscosity and gel problems in the mud, as well as increasing wear in mud pumps and other mechanical equipment used for drilling. In some shale shakers a fine screen cloth is used with the vibrating screen. The screen may have two or more overlying layers of screen cloth. The frame of the vibrating screen is resiliently suspended or mounted upon a support and is caused to vibrate by a vibrating mechanism, e.g. unbalanced weights on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. Such screens present problems of alignment, continuity, and sealing when two or more of them are used adjacent each other in series. When such screens are also tiered the problems are exacerbated. Simply butting the screens up against each other is not an adequate solution, nor is spacing them apart leaving a trough between screen ends. There has long been a need for efficient devices and apparatuses for effectively utilizing a series of two- or three-dimensional screens.

SUMMARY OF THE PRESENT INVENTION

The present invention, in one embodiment includes a shale shaker with a frame; a "basket" or screen mounting apparatus; one or more screens; and basket vibrating apparatus. The screens have complimentary interconnection structures which serve to provide a smooth interface between the screens, to securely connect the screen ends, to align the screens, and to seal the screens' interface. In one aspect such structures include one or more pin or male protrusions on an end of a first screen which are sized, configured, and disposed to be received within box or female openings on an end of an adjacent second screen. In one embodiment the openings on the second screen are at least partially defined by raised portions of the second screen and male protrusions are formed integrally of or extend from raised portions of the first screen.

In one aspect, no additional adhesive, weld, or other securement is used between the screen ends. In another aspect the screen-to-screen interface (after the female openings have received the male protrusions) is welded, soldered, brazed, or epoxied in spot, intermittent or solid strip fashion as desired for increased strength, maintenance of alignment, and enhanced screen-to-screen sealing.

In one embodiment the male protrusions are separate blocks or plugs, each with one end that extends into, is received in, and is secured in the open end portions of the first screen and with a second end that extends into, is received in, and is secured in corresponding open end portions of the second adjacent screen. Such blocks or plugs may be made from screen, wire mesh, perforated metal, (or any combination thereof), plastic, a composite material, metal, or any suitable material—hollow, solid, and/or perforated. In addition to the securement of the plug ends in the openings with a press fit or friction fit, additional securement as discussed above may be used on one or both plug ends. In another aspect a first plug with two male ends is inserted into an opening of a first screen, a second plug with a male and a female opening is inserted into a corresponding opening of an adjacent second screen, and a male end of the first plug is inserted into the female end of the second plug as the two screens are moved into abutting relationship.

In another embodiment a unitary structure with multiple plugs each having two male ends and a bottom strip interconnecting all the plugs is used by inserting an end of a plug into each opening of a first screen. The other male ends are then inserted into corresponding openings of a second adjacent screen or into openings of a corresponding unitary structure with a plurality of female openings, one adjacent each corresponding protruding male plug end.

In certain preferred embodiments the screen end openings are triangular, rectangular, semi-circular, oval or some approximate form of these shapes and the plugs ends have a corresponding mating shape. With proper forming and shaping of the plugs and screen openings, with non-tiered screens a relative smooth continuous surface from one screen to another is presented to material flowing over the screens.

In one embodiment in which two (or more) screens are in a tiered configuration, the plug ends or male protrusions projecting from a first screen are disposed beneath or so that they project downwardly from a first screen into openings of a second lower adjacent screen (or vice versa). This embodiment may also be used with flat or substantially flat screens (tiered or non-tiered) by placing male-end plugs or structures beneath an end of a first flat screen and structure with corresponding female openings beneath the corresponding end of an adjacent screen (such structures either formed integrally of the screens or secured thereto).

In one embodiment two adjacent three-dimensional screens each with a plurality of corresponding raised portions are connected in abutting relationship with one or more connectors, each connector having opposed openings, slots, or grooves on either side thereof into which each screen end is inserted. In one aspect the connector is formed integrally of one screen end by one or more folds of the screen into which the other screen end is inserted. In another embodiment in which two flat screens have abutting ends, one end of a first screen is received in and held in a slot or groove formed by one or more folds of screen at an adjacent end of a second screen.

It is, therefore, an object of at least certain preferred embodiments of the present invention to provide:

New, useful, unique, efficient, non-obvious screens, filtering screens, sealed adjacent screens, aligned adjacent screens for both two-dimensional and three-dimensional screens, for both tiered and non-tiered screens, and shale shakers with such items;

A screen for a shale shaker with one or more sealing elements secured therebetween and thereto;

A shale shaker with a plurality of three-dimensional screens, at least two of such screens each with an end sealed against and aligned with an end of the adjacent screen; and, in one aspect, such a shale shaker in which screens are tiered; and Screen connection apparatus for interconnecting adjacent ends of two abutting screens to align, connect, and seal the screen ends; in one aspect such screens which are three-dimensional; and in one aspect such apparatus formed integrally of a portion of one of the screens.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this parent's object to claim this invention no matter how others may later disguise it by variations in form or additions of further improvements.

DESCRIPTION OF THE DRAWINGS

A more particular description of embodiments of the invention briefly summarized above may be had by references to the 5 embodiments which are shown in the drawings which form a part of this specification. These drawings illustrate certain preferred embodiments and are not to be used to improperly limit the scope of the invention which may have other equally effective or equivalent embodiments.

FIG. 1C is a perspective view of a screen pair according to the present invention.

FIG. 2 is a perspective view of screens according to the present invention.

DESCRIPTION OF EMBODIMENTS PREFERRED AT THE TIME OF FILING FOR THIS PATENT

Figure 1A:
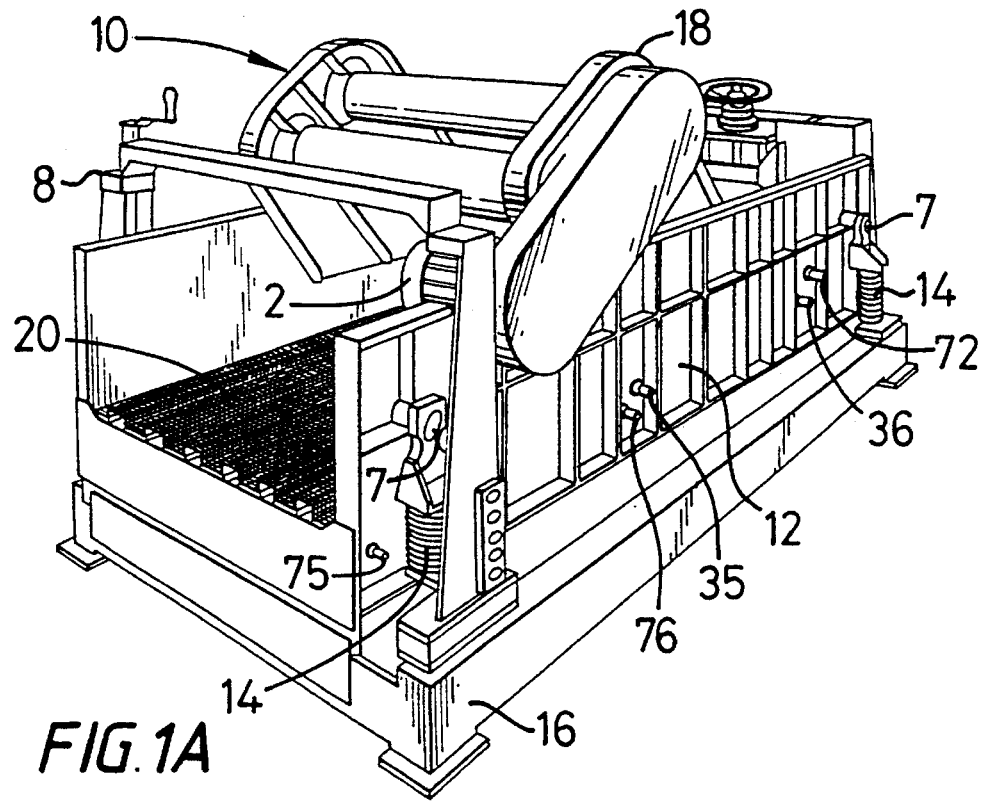
FIG. 1A is a perspective view of a shale shaker according to the present invention with screens according to the present invention.

Referring now to FIG. 1A, a shale shaker 10 according to the present invention has screens 20 (one shown) (each covered with screening cloths or cloths as desired) according to the present invention mounted on vibratable screen mounting apparatus or "basket" 12. The basket 12 is mounted on springs 14 (only two shown; two as shown are on the opposite side) which are supported from a frame 16. The basket 12 is vibrated by a motor 2 and interconnected vibrating apparatus 18 which is mounted on the basket 12 for vibrating the basket and the screens. Elevator apparatus 8 provides for raising and lowering of the basket end.

Figure 1B:
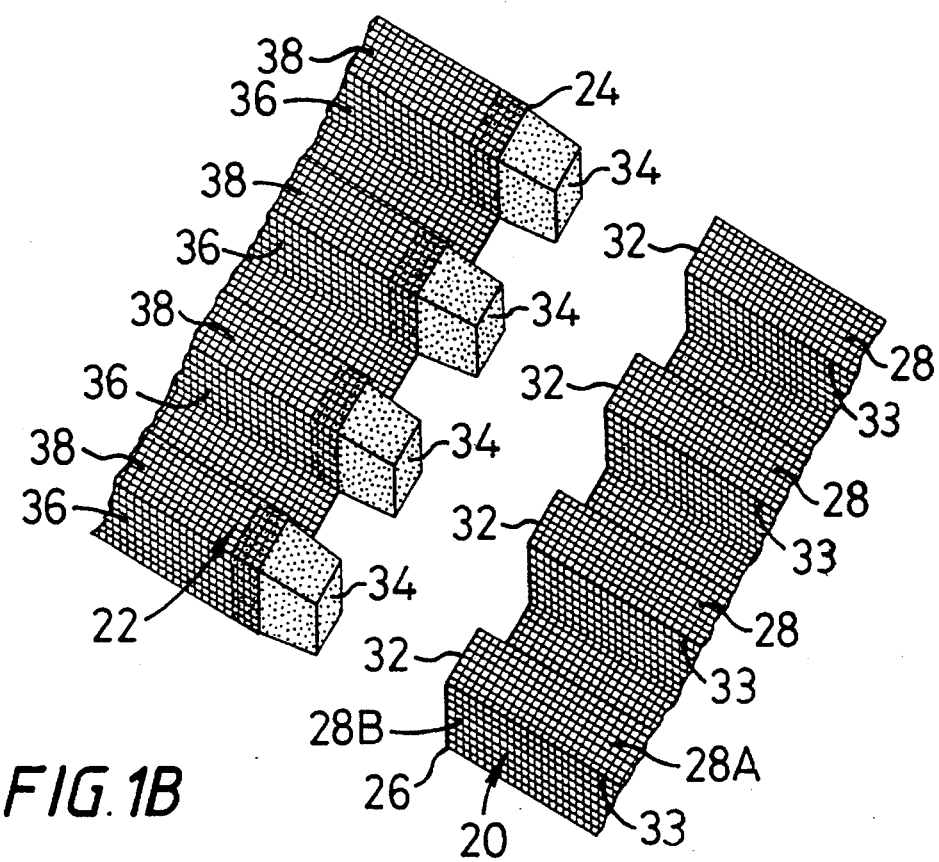
FIG. 1B is a partial perspective view of two screens used in the shale shaker of FIG. 1A.

FIG. 1B illustrates an end of the screen 20 and an end 24 of another screen 22 (adjacent the screen 20 in the shale shaker 10 but not shown in FIG. 1). An end 26 of the screen 20 is formed with integral raised screen portions 28 each of which has a top 28a and two opposed sides 28b which define an end opening 32. Preferably edges 33 of the tops 28a coincide with a single linear strand of screen wire or screen cloth so that cross strands are not bent along this edge.

Screen end 24 of the screen 22 has a plurality of male protrusions 34 each of which is formed of screening material and is formed integrally of the screen 22. Each protrusion 34 is positioned and configured for receipt in a corresponding end opening 32 of the adjacent screen 20. As shown in the embodiment of FIG. 1B, each protrusion 34 is in the form of a truncated pyramid to facilitate insertion into the end openings 32 and to promote sealing of the interface between the two screens.

The screen 22 also has raised side portions 36 (like the sides 28b of the screen 20) and the top portions 38 (like the tops 28a of the screen 20) producing a corrugated screen surface which has more screening area than a flat surface.

Preferably for the embodiment of Fig, 1B the screens are thus corrugated along their entire length. One (or more) additional screen may be used in the shaker 10 adjacent the end (not shown) of the screen 22.

As shown in FIG. 1C separate plugs 52 emplaced in end openings 54 of a screen 50 according to the present invention have truncated noses 56 which are received in frame members 58 secured in female openings 62 of a screen 60 which is to be used adjacent the screen 50 (in a manner similar to that of the screens 20 and 22 previously described). The plugs 52 may be solid; hollow; or partially hollow, e.g. with a solid nose 56 and a hollow body or vice-versa. The plugs 52 may be made from metal and welded, brazed, soldered, or otherwise bonded in place in the openings 54 to the screen 50; and the plugs may also be similarly bonded, etc., to the screen 60 in the openings 62. The plugs may be made of plastic, wood, a composite material, or any other suitable material and similarly bonded to one or both screens. It is within the scope of this invention for the noses 56 to be first held in and/or bonded in the openings 62 and to then insert plug ends 66 into the openings 54. Alternatively or in addition a plug, nose, connector, etc. may be connected with a friction fit and/or a snap fit to a screen or screen opening or frame. Alternatively a friction fit and/or snap fit may be used at either or both ends. Additional plugs 52 at the other end of the screen 60 provide interconnection with another screen (not shown). The frame members 58 may be deleted and the plug 52 inserted into the female opening 62 if properly sized. The screen 50 is mounted to a perforated support grid 59 and the screen 60 is mounted to a perforated support grid 68.

FIG. 2 illustrates a screen 70 disposed adjacent a screen 80. Each of these screens has a relatively flat screen or screen cloth top surface 72 and 82, respectively. Secured to, held within, or formed integrally of an end 71 of the screen 70 are a plurality of plugs 73 each with an end 74 and a nose 75. Each nose 75 protrudes into a corresponding end opening 84 of the screen 80. It is within the scope of this invention to use one or more plugs 73 each with a corresponding opening 84 on the adjacent screen. It is also within the scope of this invention to have one large plug which extends along a substantial portion of the end of the screen 70 and which has a corresponding opening in the screen 80. Each plug 73 may be bonded, etc. or held in place as are the items previously described for the screens of FIG. 1B and 1C. The screens 70 and 80 may be used with the shale shaker 10 (FIG. 1).

Figure 3:
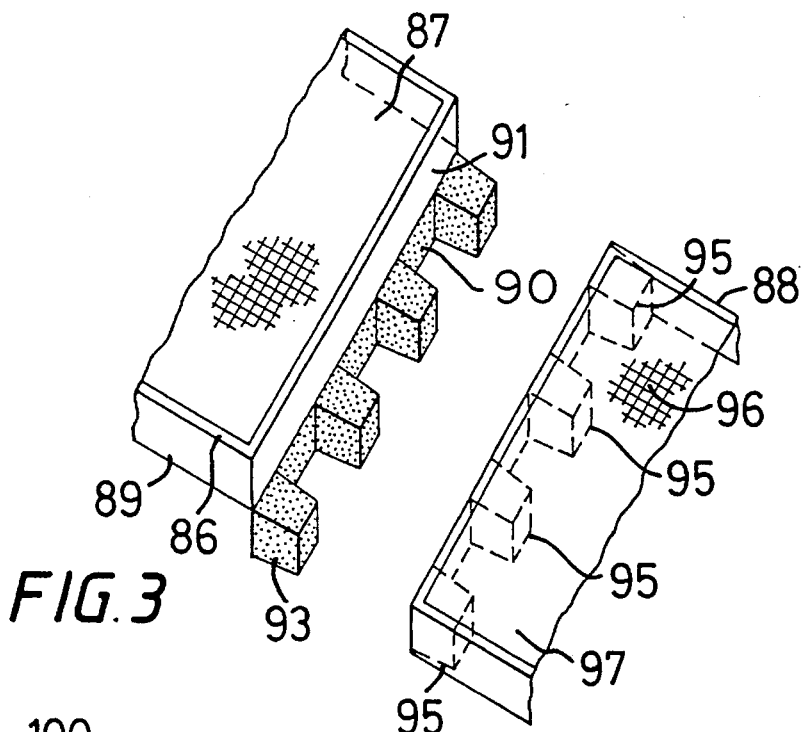
FIG. 3 is a perspective view of screens according to the present invention.

FIG. 3 illustrates a pair of rectangular tiered screens 86 and 88 (shown partially) according to the present invention which may be used adjacent each other in a shale shaker or other screening apparatus (e.g. the shale shaker 10, FIG. 1). The screen 86 has a top surface 87 made of one or more screens and/or screen cloths and an outer frame 89 around the screen encompassing its entire perimeter. A plug device 90 is secured to an end 91 of the frame 89, projecting beneath the screen 86 (or formed integrally of the frame 89). The plug device 90 has one or more plugs 93 (shown preferably as truncated pyramids) protruding from it for reception in corresponding female openings 95 in an end 96 of the screen 88. It is within this invention's scope for the female openings 95 to be formed integrally of screen or screen cloth 96 which forms top surface 97 of the screen 88 or for a separate piece to be made of screen, screen cloth, or solid material having the appropriate openings formed therein. Upon assembly, the screen 88 will be disposed lower than the screen 86.

Figure 4:
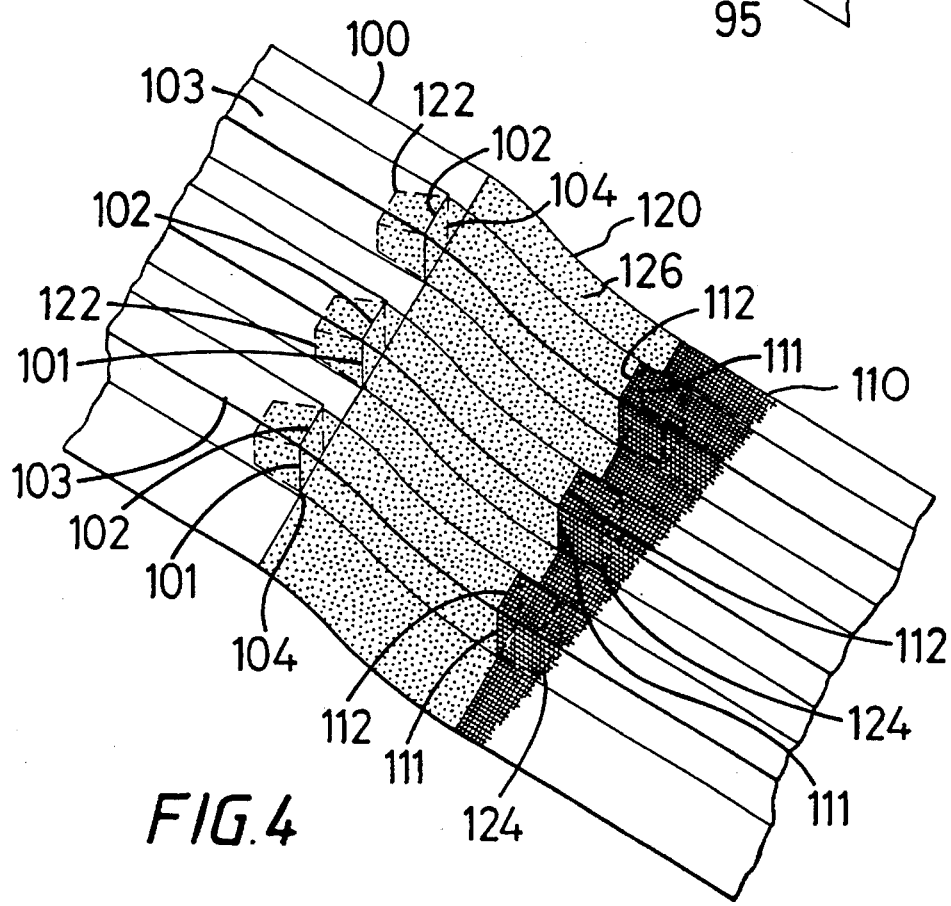
FIG. 4 is a perspective view of screens according to the present invention.

FIG. 4 illustrates a pair of screens 100, 110 according to the present invention useful in shale shakers and screening apparatus (e.g. the shale shaker 10, FIG. 1). The screen 100 is disposed higher than the screen 110 due to the configuration and disposition of a screen connector member 120. The screens 100 and 110 are corrugated similar to the screens 20 and 22 previously described. Sides 101 and tops 102 of corrugations 103 of the screens 100 define end openings 104 which receive plugs 122 of the screen connector 120. Sides 111 and tops 112 of corrugations 113 of the screen 110 define end openings 114 which receive plugs 124 of the screen connector 120. Between the plugs 122 and 124 is a body member 126 which descends downwardly from the top screen 100 and the plugs 122 to the plugs 124 and the lower screen 110. The body member 126 of the screen connector 120 may be made, in whole or in part or in some combination, of solid or perforated metal, screen, screen cloth, plastic or other suitable material as may be the plugs 122, 124.

Figure 5A:
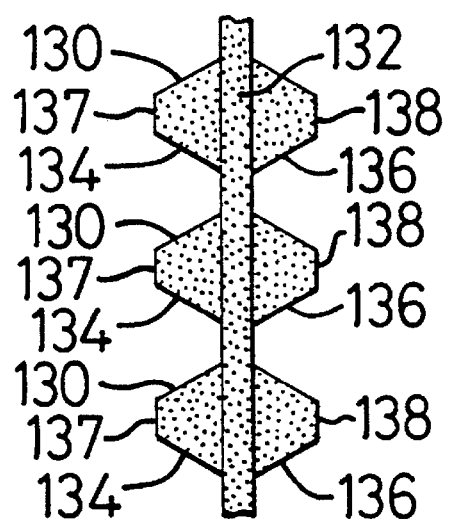
FIG. 5A is an top view of a screen connector according to the present invention.
Figure 5B:
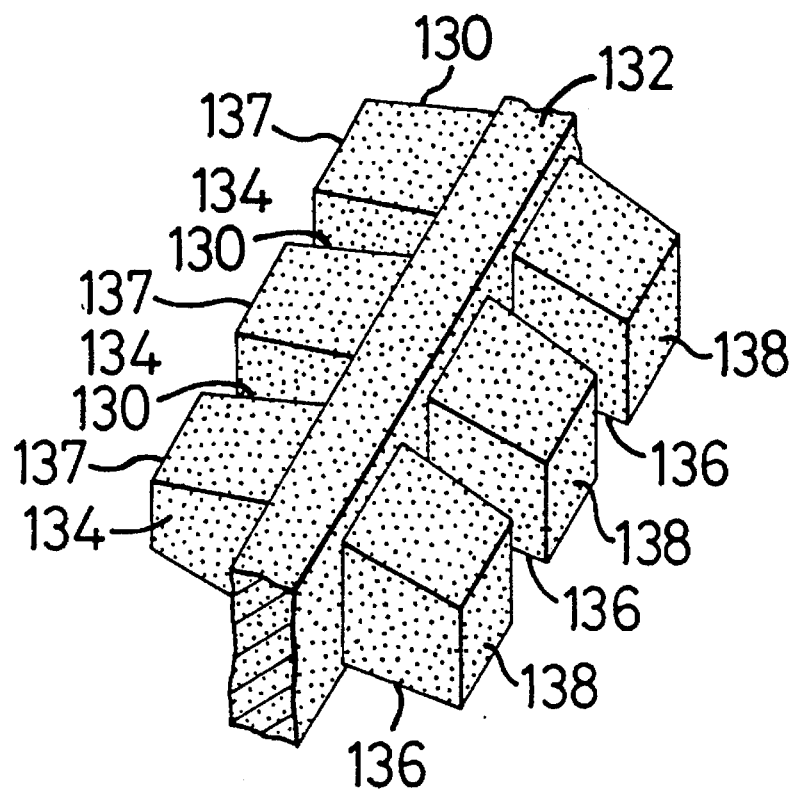
FIG. 5B is a perspective view of the screen connector of FIG. 5A.

FIG. 5A is a top view of a screen connector 130 according to the present invention. FIG. 5B is a perspective view of the connector 130. The connector 130 has a body 132 with a plurality of projections 134 on one side and a plurality of projections 136 on the other side. Each set of projections is configured and disposed for receipt in corresponding end openings or device recesses on one of a pair of screens which are to be placed adjacent each other. Although noses 137, 138 or truncated pyramid shapes are preferred, ends of the projections 134, 136 may be any suitable shape, tapered or straight.

The plug device 90 (FIG. 3), the connector member 120 (FIG. 4), and the screen connector 130 (FIG. 5A) may be permanently or releasably secured to or releasably securable to a shale shaker, e.g. to basket 12, FIG. 1, to facilitate screen emplacement and removal and proper screen positioning.

Figures 6A, 6B, 6C, 9:
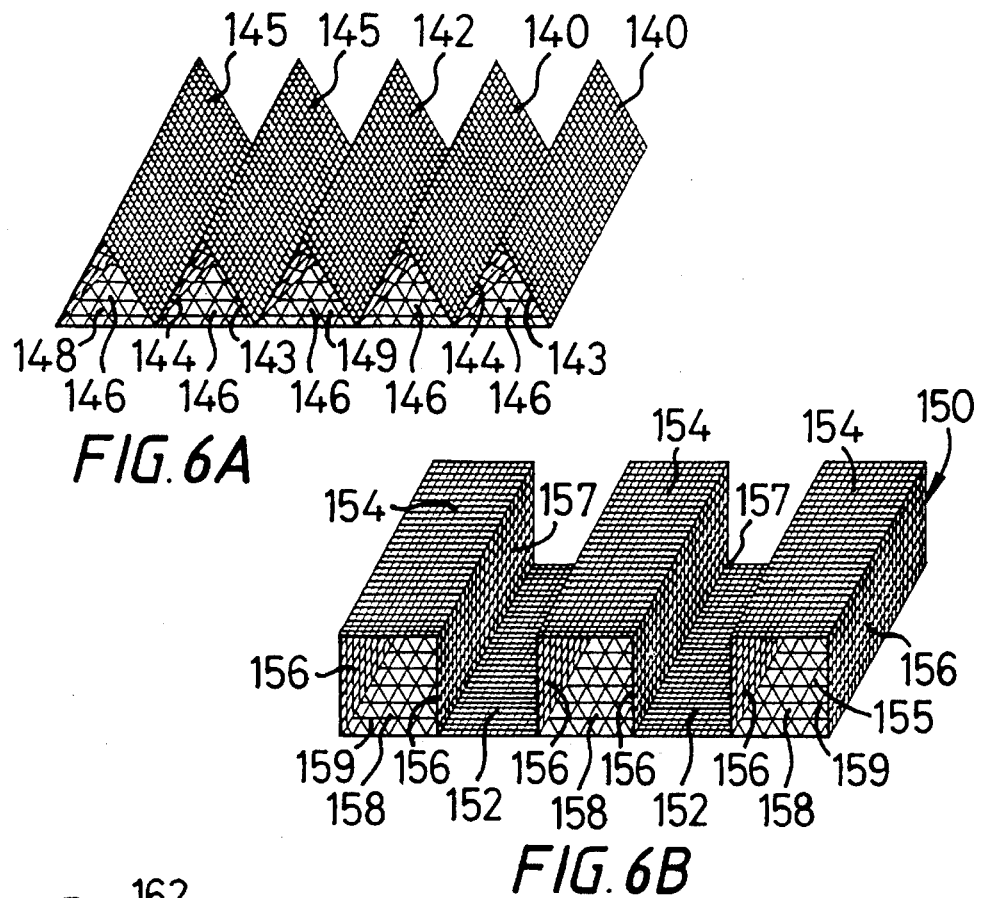
FIGS. 6A, 6B, and 6C are perspective views of screens useful with devices of the present invention.
FIG. 9 is a perspective end view of a screen according to the present invention useful with devices of the present invention.

FIGS. 6A, 6B and 6C show certain preferred embodiments of screen configurations according to the present invention which may be used with any of the previously described screens or apparatuses. The screens in FIGS. 6A–C may have frame members therearound (as in FIG.3) or thereunder. FIG. 6A shows a screen 140 with a multiple triangular screen surface 142. The screen 140 is mounted on a perforated support grid 148 with a plurality of openings 149 therethrough. Sides 143, 144 of triangular raised screen portions 145 define end openings 146 which may receive a plug or projection, or part of a screen connector as previously described.

FIG. 6B shown a screen 150 with a bottom substantially flat surface 152, top surfaces 154, and sides 156. The top surfaces 154 and sides 156 define a plurality of corrugations 157 and a plurality of end openings 158 which are suitable for disposition therein of a plug, projection, or screen connector part as previously described. The screen 150 is mounted on a support grid 155 which has a plurality of holes 159 therethrough.

FIG. 6C shows a screen 160 with a continuous undulating surface 162 which forms end openings 164 which are suitable for disposition therein of a plug, projection, or screen connector part as previously described. The screen 160 may be mounted to a lower support grid (not shown). To facilitate plug entry into the end openings of the screens of FIGS. 6A–C and FIG. 9 and/or to enhance sealing or alignment, end frame members of appropriate shape and size (similar to the frame members 58 of FIG. 1C) may be used with the screens of FIGS. 6A–C and FIG. 9. Alternatively these screens (FIGS. 1A, 1C, 2, 3, 4, 6A–C and 9) may be mounted on a lower peripheral frame and/or a lower perforated plate, expanded metal, screen cloth, or screen.

Figures 7A, 7B:
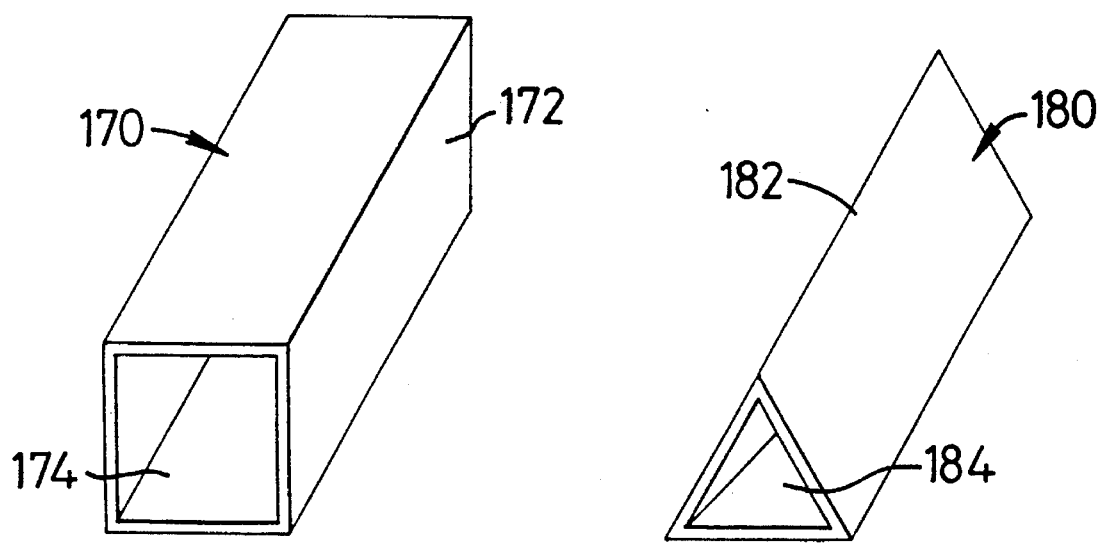
FIG. 7A is a perspective view of a connector according to the present invention.
FIG. 7B is a perspective view of a connector according to the present invention.

FIG. 7A shows a screen connector sleeve 170 with a body 172 and a channel 174 therethrough. Such sleeves may be used with plugs or projections as previously described and with screens as previously described (e.g. in ends of the screens 50, 60, described above) to facilitate plug receipt and to facilitate the holding of plugs. A sleeve 180 with a body 182 and central channel 184 is useful with a screen (e.g. screen 140, FIG. 6A) having openings with a similar shape.

Figure 8A:
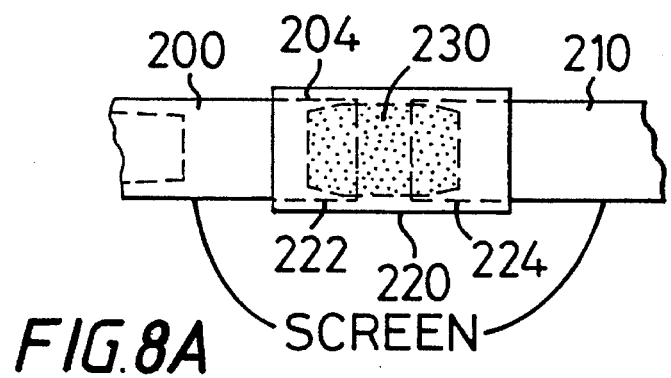
FIG. 8A is a side view of screen apparatus according to the present invention.
Figure 8B:
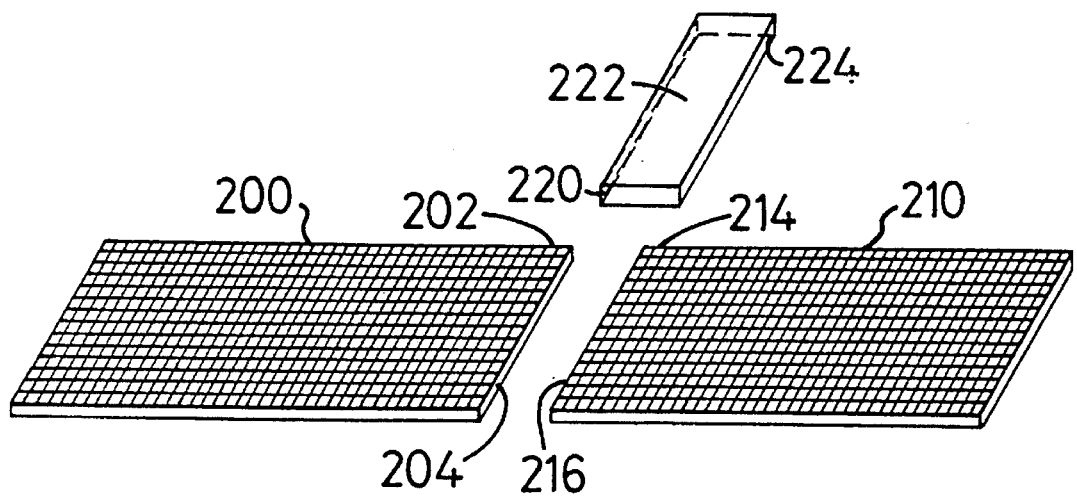
FIG. 8B is a perspective view, exploded, of the apparatus of FIG. 8A.

FIGS. 8A and 8B show a screen pair 200, 210 and an outer connector 220 according to the present invention. The connector 220 has one end opening 222 for receiving an end 202 of the screen 200 and another end opening 224 for receiving an end 214 of the screen 210. Optionally an inner plug 230 with ends 232, 234 may be used with an end projecting into recesses or openings 204, 216 in the screens, respectively. The plug 230 may be used without the connector 220. Each screen described herein may include one or more layers of screening material, screen cloth, grid, perforated plate, or expanded metal in any desired number, combination, or order and bonded or secured together as desired. Each screen described herein with raised screen portions may have a flat plate or screen member on which the upper screen is the screen with the raised portions. Alternatively frames of suitable material may be used at each opening for a plug or other connector protrusion into which and through which the plug or other connector protrusion extends.

FIG. 9 shows a screen 250 according to the present invention which may be used with any of the previous interconnection devices shaped suitably for connection at or in trapezoidal opening 252 defined by slanted sides 254 and tops 256 of each raised portion of screen. The edges 262 of each raised portion preferably coincide with a strand of screen material 266 so that bending of strands perpendicular to these edges is reduced, minimized, or eliminated. Such edges may be made of a strand of increased cross-sectional area and/or of stronger material than the remainder of the screen; or the strand may be reinforced with epoxy, solder, or the like. The screen 250 is mounted on a lower support grid 258 with a plurality of holes 259 therethrough. The screen 250 may have a frame therearound or thereunder and/or with one or more cross-support members.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A screen combination for a shale shaker, the screen combination having a first screen and a second screen, the screen combination comprising each of the first screen and the second screen having a frame with two end members interconnected by two spaced-apart side members which define an opening through the frame, screening material attached to each frame and covering each frame's opening, interconnection means at a first end of the first screen for interconnecting the first end with a second end of the second screen adjacent the first end of the first screen, the screening material on each screen with a plurality of raised portions therealong whose ends define a plurality of end openings, the interconnection means including a connector member with a body and a first set of a plurality of first plugs protruding from the body, one first plug corresponding to and disposed in each end opening of the first end of the first screen, and the connector member having a second set of a plurality of second plugs protruding from the body, each second plug in a corresponding end opening of the second end of the second screen.

2. A connector for interconnecting two adjacent screens including a first screen and a second screen, the first screen having screening material with raised portions defining a plurality of first screen openings and the second screen having screening material with raised portions defining a plurality of second screen openings, the connector comprising a body member with two spaced apart sides including a first side and a second side a first set of protrusions projecting from the first side of the body member each protrusion of the first set of protrusions for insertion into one of the first screen openings, and a second set of protrusions projecting from the second side of the body member, each protrusion of the second set of protrusions for insertion into one of the second screen openings.

3. The connector of claim 2 wherein each protrusion has a truncated nose.

4. The connector of claim 2 wherein the first set of protrusions is disposed above the second set of protrusions so that upon interconnection therewith of the two screens the second screen is disposed lower than the first screen.

5. The connector of claim 2 wherein the connector is made of screening material.

6. The connector of claim 2 wherein the connector is solid.

7. A screen for a shale shaker, the screen comprising a frame, having two end members interconnected by two spaced-apart side members which define an opening, the frame having a first end and a second end, screening material attached to the frame and covering the opening, interconnection means at the first end of the frame for interconnecting the first end with an end of an adjacent screen, the screening material with a plurality of raised portions whose ends define a plurality of end openings, and the interconnection means includes a plurality of plugs, each plug with an end nose disposed within one of the end openings.

8. The screen of claim 7 wherein the screen is a first screen and further comprising the interconnection means comprising at least one plug protruding from the first frame end for extension into and receipt within a corresponding end opening in an end of a second adjacent screen.

9. The screen of claim 7 including the first screen in combination with the adjacent screen.

10. The screen of claim 9 wherein interconnecting of the screen and of the adjacent screen by the interconnection means results in the screen and adjacent screen being substantially level with each other.

11. The screen of claim 8 wherein the at least one plug is sealingly received in the corresponding opening.

12. The screen of claim 8 wherein the at least one plug is secured within the corresponding opening.

13. The screen of claim 7 wherein the screen is a first screen and further comprising the interconnection means at one first frame end disposed on the first frame end so that upon interconnecting the first frame end with an adjacent second screen the adjacent second screen is positioned below the first screen.

14. The screen of claim 13 including the first screen and the adjacent second screen in combination.

15. The screen of claim 7 further comprising each plug having a protrusion-protruding from the screen for receipt in a corresponding end opening of an adjacent screen.

16. The screen of claim 15 wherein the screen is a first screen and the adjacent screen is a second screen and the first screen is in combination with the second screen.

17. A screen for a shale shaker, the screen comprising a frame, having two end members interconnected by two spaced-apart side members which define an opening, the frame having a first end and a second end, screening material attached to the frame and covering the opening, interconnection means at the first end of the frame for interconnecting the first end with an end of an adjacent screen, the screening material with a plurality of raised portions whose ends define a plurality of end openings, and the interconnection means includes a connector member having a body and a first set of a plurality of first plugs protruding from the body, one first plug corresponding to and disposed in each end opening, and a second set of a plurality of second plugs protruding from the body, each of the second plugs for disposition in an opening of an adjacent screen.

18. The screen of claim 17 further comprising the connector member having a second set of a plurality of second plugs protruding from the body, each second plug for insertion into a corresponding end opening of an adjacent screen.

19. The screen of claim 18 wherein the screen is a first screen and the adjacent screen is a second screen, and including the first screen in combination with the second screen.

20. The screen of claim 18 wherein the first set of a plurality of first plugs is disposed above the second set of a plurality of second plugs so that upon interconnection of the first screen and the second screen the first screen is higher than the second screen.

21. A screen for a shale shaker, the screen comprising a frame, having two end members interconnected by two spaced-apart side members which define an opening, the frame having a first end and a second end, screening material attached to the frame and covering the opening, interconnection means at the first end of the frame for interconnecting the first end with an end of an adjacent screen, the interconnection means made of screening material.

22. A screen for a shale shaker, the screen comprising a frame, having two end members interconnected by two spaced-apart side members which define an opening, the frame having a first end and a second end, screening material attached to the frame and covering the opening, interconnection means at the first end of the frame for interconnecting the first end with an end of an adjacent screen, and the screening material with a plurality of raised portions whose ends define a plurality of end openings whose shape viewed on end is trapezoidal.

23. A screen for a shale shaker, the screen comprising a frame, having two end members interconnected by two spaced-apart side members which define an opening, the frame having a first end and a second end, screening material attached to the frame and covering the opening, interconnection means at the first end of the frame for interconnecting the first end with an end of an adjacent screen, the screening material with a plurality of raised portions whose ends define a plurality of end openings, and an open frame disposed in each end opening for receiving an end of a plug emplaceable therein.

24. A shale shaker comprising a basket support frame, a screen basket movably mounted to the basket support frame, vibrating means interconnected with the screen basket for vibrating the screen basket, a screen combination secured to the screen basket for intercepting and screening drilling fluid introduced into the screen basket, the screen combination comprising a first screen and a second screen in combination, the screen combination further comprising, each of the first screen and the second screen having a screen frame with two end members interconnected by two spaced-apart side members which define a screen frame opening, screening material attached to each screen frame and covering each screen frame opening, the screening material on each screen with a plurality of raised portions whose ends define a plurality of end openings, interconnection means for interconnecting the first screen and the second screen and including a connector member with a body and a first set of a plurality of first plugs protruding from the body, one first plug corresponding to and disposed in each end opening of an end of the first screen, and the connector member having a second set of a plurality of second plugs protruding from the body, each second plug in a corresponding end opening of an end of the second screen.

\* \* \* \* \*